United States Patent
Avery et al.

(10) Patent No.: US 9,418,065 B2
(45) Date of Patent: Aug. 16, 2016

(54) TRACKING CHANGES RELATED TO A COLLECTION OF DOCUMENTS

(75) Inventors: Kenytt D. Avery, Newport Beach, CA (US); Edward L. Bader, Los Angeles, CA (US); Chi M. Nguyen, Irvine, CA (US); Marc B. Velasco, Orange, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/358,594

(22) Filed: Jan. 26, 2012

(65) Prior Publication Data

US 2013/0198145 A1   Aug. 1, 2013

(51) Int. Cl.
*G06F 17/30* (2006.01)

(52) U.S. Cl.
CPC .... *G06F 17/30011* (2013.01); *G06F 17/30067* (2013.01)

(58) Field of Classification Search
CPC ............... G06F 17/30011; G06F 17/30067; G06F 17/30286
USPC .............................................. 707/687, 999.2
See application file for complete search history.

(56) References Cited

U.S. PATENT DOCUMENTS

| | | | |
|---|---|---|---|
| 5,806,078 A | 9/1998 | Hug et al. | |
| 5,890,164 A | 3/1999 | Nielsen | |
| 5,999,947 A | 12/1999 | Zollinger et al. | |
| 6,108,670 A | 8/2000 | Weida et al. | |
| 6,681,369 B2 * | 1/2004 | Meunier et al. | 715/255 |
| 7,051,009 B2 * | 5/2006 | Suermondt et al. | 706/20 |
| 7,610,545 B2 | 10/2009 | Wagner et al. | |
| 7,693,864 B1 | 4/2010 | Pasupathy et al. | |
| 7,721,259 B2 | 5/2010 | Heinke et al. | |
| 7,953,724 B2 * | 5/2011 | Griffith | 707/708 |
| 7,987,172 B1 | 7/2011 | Carver | |
| 8,250,037 B2 * | 8/2012 | Andersen et al. | 707/641 |
| 8,284,198 B1 * | 10/2012 | Hackworth et al. | 345/440 |
| 8,538,989 B1 | 9/2013 | Datar | |
| 8,555,157 B1 | 10/2013 | Fu | |
| 9,015,118 B2 | 4/2015 | Velasco | |
| 2002/0023097 A1 | 2/2002 | Ripley | |
| 2002/0073138 A1 | 6/2002 | Gilbert | |

(Continued)

FOREIGN PATENT DOCUMENTS

| | | |
|---|---|---|
| CN | 1794207 A | 6/2006 |
| WO | 2006026636 A2 | 3/2006 |
| WO | 2011150027 | 1/2011 |

OTHER PUBLICATIONS

Xuezhi Wang et al., ADANA: Active Name Disambiguation, 2011, IEEE, 794-803.*

(Continued)

*Primary Examiner* — Jean B Fleurantin
(74) *Attorney, Agent, or Firm* — Farrokh Pourmirzaie;SVL IPLAW

(57) ABSTRACT

Changes to a collection of documents are tracked by generating content information for the collection of documents identifying initial content within the collection of documents and assigning an indicator a value indicating absence of changes to the collection of documents. A change to the collection of documents is detected and the value of the indicator is adjusted in accordance with the detected change to indicate an amount of the initial content within the modified collection of documents.

21 Claims, 4 Drawing Sheets

(56) References Cited

U.S. PATENT DOCUMENTS

| | | |
|---|---|---|
| 2002/0123988 A1 | 9/2002 | Dean et al. |
| 2004/0019846 A1 | 1/2004 | Castellani et al. |
| 2005/0060281 A1 | 3/2005 | Bucher et al. |
| 2005/0071741 A1 | 3/2005 | Acharya |
| 2005/0154761 A1 | 7/2005 | Lee et al. |
| 2005/0165865 A1 | 7/2005 | Farmer |
| 2006/0004886 A1 | 1/2006 | Green et al. |
| 2006/0080369 A1 | 4/2006 | Razdow et al. |
| 2006/0085738 A1 | 4/2006 | Chapus et al. |
| 2006/0143243 A1 | 6/2006 | Polo-Malouvier et al. |
| 2006/0288081 A1 | 12/2006 | Sung et al. |
| 2007/0088957 A1 | 4/2007 | Carson |
| 2007/0118572 A1 | 5/2007 | Fischer et al. |
| 2007/0294246 A1 | 12/2007 | Evans et al. |
| 2008/0021922 A1 | 1/2008 | Hailpern et al. |
| 2008/0040388 A1* | 2/2008 | Petri et al. ................... 707/104.1 |
| 2008/0126399 A1 | 5/2008 | MacGregor |
| 2008/0134025 A1 | 6/2008 | Harada |
| 2008/0177755 A1 | 7/2008 | Stern et al. |
| 2008/0178302 A1 | 7/2008 | Brock et al. |
| 2008/0195509 A1 | 8/2008 | Bellacicco et al. |
| 2008/0201381 A1 | 8/2008 | Desai et al. |
| 2008/0270462 A1 | 10/2008 | Thomsen |
| 2008/0275859 A1* | 11/2008 | Griffith ............................ 707/4 |
| 2009/0024608 A1 | 1/2009 | Deolalikar |
| 2009/0063535 A1 | 3/2009 | Petri |
| 2009/0125382 A1 | 5/2009 | Delepet |
| 2009/0182780 A1 | 7/2009 | Wong et al. |
| 2009/0199090 A1 | 8/2009 | Poston et al. |
| 2009/0204595 A1 | 8/2009 | Dombrowski |
| 2009/0234833 A1 | 9/2009 | Davis, II et al. |
| 2009/0307137 A1 | 12/2009 | White et al. |
| 2009/0319910 A1 | 12/2009 | Escapa et al. |
| 2010/0107244 A1 | 4/2010 | Li et al. |
| 2010/0114628 A1 | 5/2010 | Adler et al. |
| 2010/0251374 A1 | 9/2010 | Dill et al. |
| 2010/0287204 A1 | 11/2010 | Amini et al. |
| 2010/0299339 A1 | 11/2010 | Kementsietsidis et al. |
| 2011/0047056 A1 | 2/2011 | Overman et al. |
| 2011/0296507 A1* | 12/2011 | Khosrowshahi et al. ......... 726/7 |
| 2011/0313848 A1 | 12/2011 | Vaidyanathan |
| 2012/0254048 A1* | 10/2012 | Roberts et al. ................ 705/317 |
| 2012/0254128 A1* | 10/2012 | Bath et al. ..................... 707/689 |
| 2013/0018848 A1* | 1/2013 | Velasco ......................... 707/687 |
| 2013/0018858 A1 | 1/2013 | Velasco |
| 2013/0018873 A1 | 1/2013 | Velasco |
| 2013/0198145 A1 | 8/2013 | Avery et al. |
| 2014/0025645 A1 | 1/2014 | Brown et al. |
| 2014/0032513 A1 | 1/2014 | Gaither |
| 2014/0280204 A1 | 9/2014 | Avery et al. |
| 2014/0379657 A1 | 12/2014 | Avery |

OTHER PUBLICATIONS

International Search Report and Written Opinion in International Application No. PCT/IB2012/052734, mailed Oct. 18, 2012, all page.

FortiDB Version 3.2 Metadata Monitor User Guide, www.fortinet.com, Dec. 19, 2008, all page.

M. Gao, "Recording How—Provenance on Probabilistic Databases", 2010 12th International Asia-Pacific Web Conference, Shanghai, China, pp. 205-211.

P. Groth, "A Distributed Algorithm for Determining the Provenance of Data", Fourth IEEE International Conference on eScience, 2008, pp. 166-173.

IBM, ip.com PriorArtDatabase, "System and Methods to Enable Trusted Provenance Tracking and Rights/Responsibilities Evaluation in Collaborative Developing Environment", Oct. 17, 2006 (8 pages).

Y. Simmhan, "A Framework for Collecting Provenance in Data-Centric Scientific Workflows", IEEE International Conference on Web Services, 2006, Bloomington, IN, (8 pages).

U.S. Appl. No. 13/183,840, filed Jul. 15, 2011, all page.

U.S. Appl. No. 13/183,847, filed Jul. 15, 2011, all page.

U.S. Appl. No. 13/183,850, filed Jul. 15, 2011, all page.

U.S. Appl. No. 13/555,559, filed Jul. 23, 2012, all page.

PCT International Search Report dated May 6, 2013, 8 pages.

* cited by examiner

TRACKING CHANGES RELATED TO A COLLECTION OF DOCUMENTS

CROSS-REFERENCE TO RELATED APPLICATIONS

Background

1. Technical Field

The present invention relates to monitoring a collection or case of documents to determine provenance of the collection.

2. Discussion of the Related Art

In the realm of electronic documents, a case can include collection of electronic documents, which can be contained within an electronic folder. The documents can be a wide variety of types of files and content, including text files (e.g., word processing documents), PDF files, video or other image files (e.g., JPEG, MPEG, etc.), PPT files, etc. Because cases can include a complex set of collections of files, some of the rules of a typical record cannot be applied to the collection. For cases, depending upon implementation, there is the possibility that additional documents may be added after the case has been declared as a record, e.g., where no information or documents were removed or changed, but additional documents may have been added. In such scenarios, the content of the case is now different than before it was declared as a record. This makes it hard to determine to what extent the collection of documents may have changed since being declared as a record.

BRIEF SUMMARY

Accordingly, embodiments of the present invention include a method, a computer program product and a system for tracking changes relating to a collection of documents. In accordance with the embodiments of the invention, content information is generated for the collection of documents identifying initial content within the collection of documents and assigning an indicator a value indicating absence of changes to the collection of documents. When a change to the collection of documents is detected, the value of the indicator is adjusted in accordance with the detected change to indicate an amount of the initial content within the modified collection of documents.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
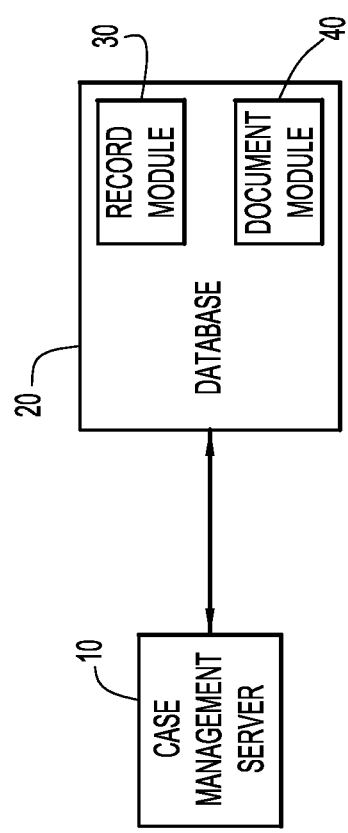
FIG. 1 is a diagrammatic illustration of an example computing environment for use with an embodiment of the present invention.

In accordance with embodiments of the present invention, a method, system and computer program product provide tracking of changes in a collection of documents by associating an indicator with the collection of documents and modifying the indicator based upon changes (e.g., addition and/or removal) of such documents and/or content associated with the collection. The indicator associated with the collection provides an indication, e.g., a provenance value, of how much of the collection is original from a particular origin or starting point (e.g., from the point at which a case of documents has been designated as a record). For example, if there has been no change to the collection of documents for its origin or starting point, the indicator or provenance value can be assigned a score of 100. Any change to the collection of documents (e.g., documents and/or content of the documents added to or removed from the collection) since the origin will result in a corresponding change in the indicator or provenance value (e.g., a decrease in the value from 100). Thus, the indicator or provenance value provides an indication at any given time of how much or to what degree the collection of documents has changed since its origin. In addition, another indicator, e.g., a lineage value, can also be provided to indicate how much or to what degree the lineage (i.e., authorship) has changed in one or more documents within the collection since the origin of the collection.

An example embodiment of the present invention is now described with reference to the block diagram of FIG. 1. A system comprises a case management server 10 that is connected with a content database 20 to facilitate access by users (e.g., database system administrators or managers, employees, clients, etc.) to collections of documents stored as records within a record module 30 located within the database 20. The database 20 further includes a document module 40 that stores documents and related metadata and/or other information associated with such documents. The documents can be of any suitable types including, without limitation, word processing/text documents (e.g., DOC files), audio/video and/or other types of image documents (e.g., JPEG files, TIFF files, MPEG files, WAV files, MP3 files, etc.), spreadsheet documents (e.g., XLS files), multimedia documents (e.g., PPT files), and any other types or formats of electronic documents (e.g., XML files, TXT files, etc.). Documents pertaining to a case can be combined into a collection, where the collection can be declared as a record.

In an example embodiment, the server 10 facilitates operations within the database 20. For example, responsive to a user request, the case management server 10 can retrieve electronic documents individually or a collection of documents stored as a record, including metadata associated with the documents. The metadata includes any suitable types of information relevant to the documents including, without limitation, originator (i.e., original author) of the document, changes made to a document (including author of the changes and date changes have been made), size of the document, title of the document, etc. A user may make changes to one or more documents of a record and/or add or remove documents from a record. When changes are made to the document, corresponding changes to the metadata associated with the document (e.g., date of change, author making change, etc.) are also made. In addition, if the document is in a collection declared as a record, the changes are noted in a manifest of the record as described herein.

The server 10 can communicate with a user via any suitable connection including, without limitation, via cloud computing, via network computing in which the server 10 is operatively coupled to one or more other servers or other devices, and/or other devices via any suitable type of carrier wave or signal for transfer of data from one source to another utilizing a suitable communication medium (e.g., bulletin board, network, LAN, WAN, Intranet, Internet, etc.). In addition, the server 10 can be integrated with the database 20 as a single device or, alternatively, the server 10 and database 20 can be separate devices that communicate with each other via any suitable connection such as the types of connections between the server 10 and users.

Any suitable computer systems implemented by any type of processor or other hardware and/or other processing circuitry can be configured to provide the server, database and record and document modules. That is, the server, database and modules may be implemented by any quantity of conventional or other computer systems or devices (e.g., computer terminals, personal computers of all configurations, including tablet, laptop, etc.), cellular telephones, personal data assistants, etc., and may include any available operating system and/or any available or custom software (e.g., browser software, communications software, word processing software, etc.). These systems may further include types of displays and input devices (e.g., keyboard, mouse, voice recognition, etc.) to enter and/or view information. As previously noted, the server and database can be separate devices or integrated as a single device.

Figure 2:
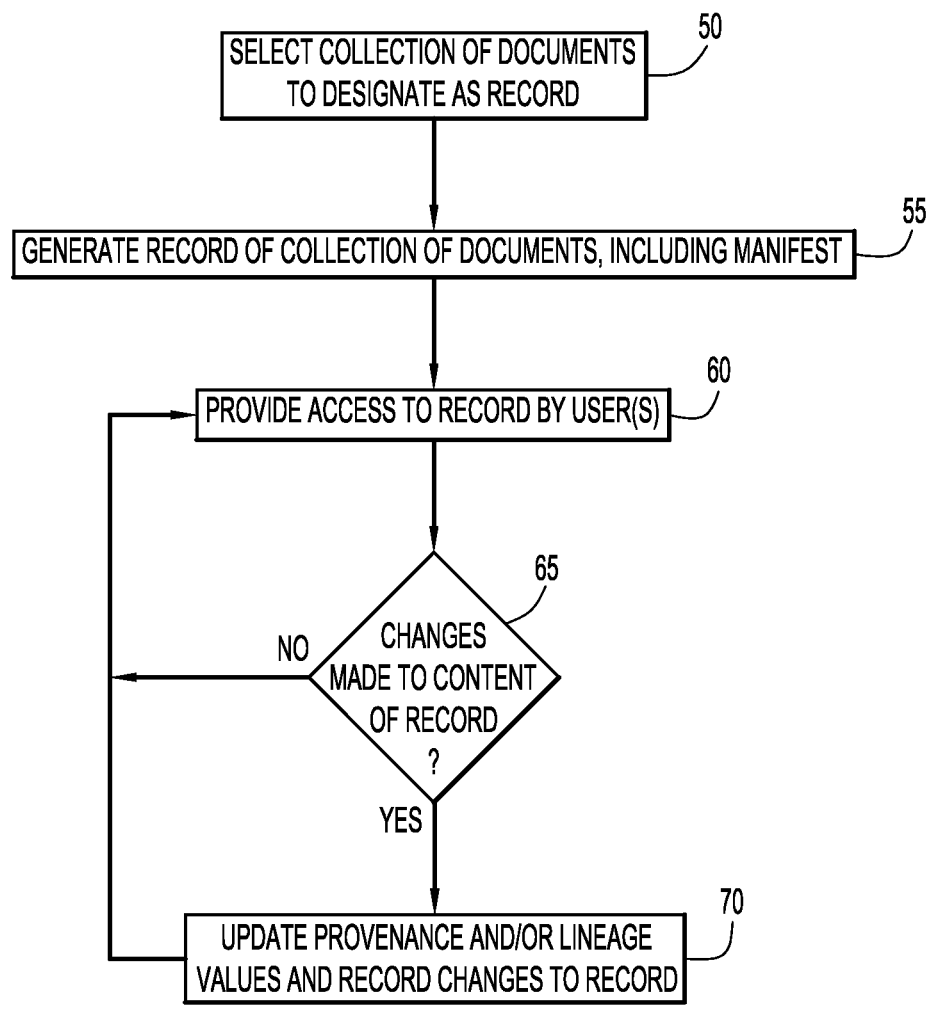
FIG. 2 provides a flowchart depicting an example method of tracking changes in a collection of documents in accordance with the present invention.
Figure 3:
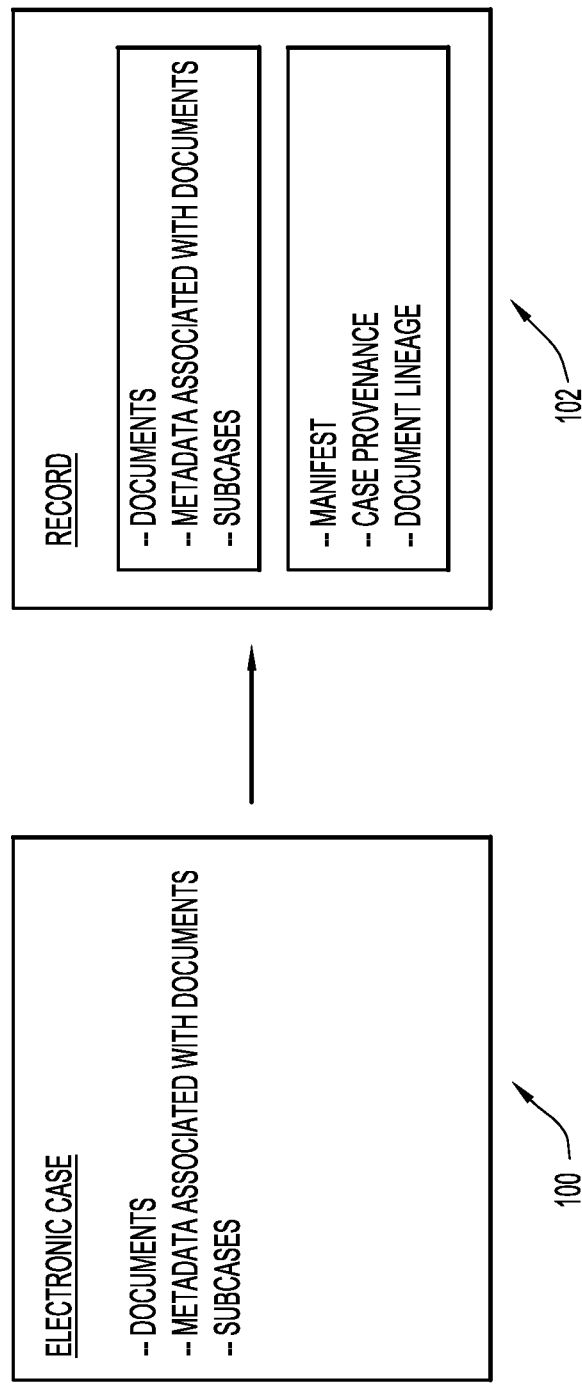
FIGS. 3 and 4 are diagrammatic illustrations of examples showing modification to a collection of documents and corresponding changes to an indicator associated with the collection.

An example method for tracking changes to collections of documents utilizing the system of FIG. 1 is now described with reference to the flow chart of FIG. 2 and also the diagrams depicted in FIGS. 3 and 4. As previously noted, the database includes a plurality of documents in the document module 40, some of which may be associated or related as a collection or case of documents (e.g., documents stored in an electronic folder). When a decision is made to declare a collection of documents as a record (step 50), a record is generated that includes formation of a manifest (step 55). The manifest includes a case provenance value and a lineage value as described in further detail herein. As schematically depicted in FIG. 3, a collection or case 100 of documents, including metadata associated with such documents and any sub-collections or sub-cases of documents, is used to generate a record 102.

The record 102 includes the listing of the same documents from the case 100 and a manifest, including case provenance indication and lineage indication values. The record need not include copies of the documents but instead a pointer or some other suitable reference to the documents and associated metadata associated with such documents as stored by the document module 40. However, an original version of each of the original documents of the collection, including original metadata content associated with the original documents, is stored (e.g., in the document module 40 or in some other suitable location of the database 20). This is because an original version of each of the documents, including their associated metadata, for the case needs to be stored for each record in order to determine changes in provenance and lineage associated with each record as content within each record is modified. The manifest of the record can store references (e.g., pointers) to the original documents and metadata associated with such original documents for purposes of determining changes in provenance and lineage indication values as content within the record changes. The manifest can also include references (e.g., pointers) to changed or modified versions of the documents and associated modified metadata for purposes of determining provenance and lineage values.

The case provenance and lineage values are originally set at initial values that indicate that case content and authorship of such content in the record 102 has not changed and is the same as the original content. For example, a case provenance value can initially be set at 100, representing a percentage value (i.e., 100%) of the content currently in the record 102 that is the same as the content originally used to generate the record 102. A lineage value can also be set to a value of 100, representing an indication of original authorship of documents at the time the record is declared. However, any other suitable provenance indication can be utilized to indicate to what extent content in the record has changed in relation to the original content provided within and authorship associated with documents of the record.

The server 10 provides access to the database 20 to users for accessing records within the record module 30 (step 60). When a user obtains access to a record 102 from the record module 30, the user may choose to add or remove a document from the record 102. The user may also change elements of one or more documents (e.g., changes made by the user to content within one or more documents and/or metadata associated with one or more documents) within a record. The server 10 monitors any changes to the record 102 made by a user (step 65) and compares such changes with the original version of the documents based upon the reference that is stored in the manifest (e.g., pointing to the location of the original version of the documents and associated metadata, which can be stored in some suitable location of the database 20).

When a user makes a change to the record 102, the server 10 updates the provenance and/or lineage value associated with the record (step 70). The server 10 can also record such changes and save the changes with the record (e.g., in the manifest or in any other suitable location of the record module 30). A suitable algorithm can be implemented to correlate any one or more changes within the record 102 with a corresponding provenance or lineage value. For example, in a scenario in which a provenance value of 100 indicates no changes from the original content associated with the generated record, any changes to content within the record will result in a lower provenance value, where the greater amount of changes to content will result in a greater deviation from the original provenance value (or provenance value indicating no changes to content within the record). So, for example, when a record is changed by inserting 2 additional documents into the record, such changes will result in a provenance value that deviates a greater amount from the original provenance value in relation to the provenance value that would be generated if instead the record is changed by the insertion of a single document into the record. In a similar manner, when a change in authorship occurs (e.g., a revision is made to a document by someone other than the original author) to a document within the record, a change in lineage value is indicated by modifying the lineage value so as to deviate from the original lineage value. For example, if the original lineage value is 100, the modified lineage value would decrease by a suitable amount in accordance with an algorithm that determines lineage based upon what percentage of the record content (e.g., what percentage of documents within the record) has changed in authorship in relation to the original authorship associated with such content.

In addition, the algorithm to determine a provenance value of the record content can weight certain types of changes differently. For example, depending upon a particular scenario, a change resulting from the addition or deletion of a document from a record may be assigned a greater weight than a change made to an existing document in the record and/or a change made to metadata associated with the existing document. The algorithm to determine a lineage value of the record can also weight changes differently and independently of the provenance value. For example, while a new document added to a record would change the provenance value for the record (since content has changed), the lineage value may stay the same, since the addition of a new document may not translate to a change in authorship of documents (since the added document would have an original author assigned to it).

Figure 4:
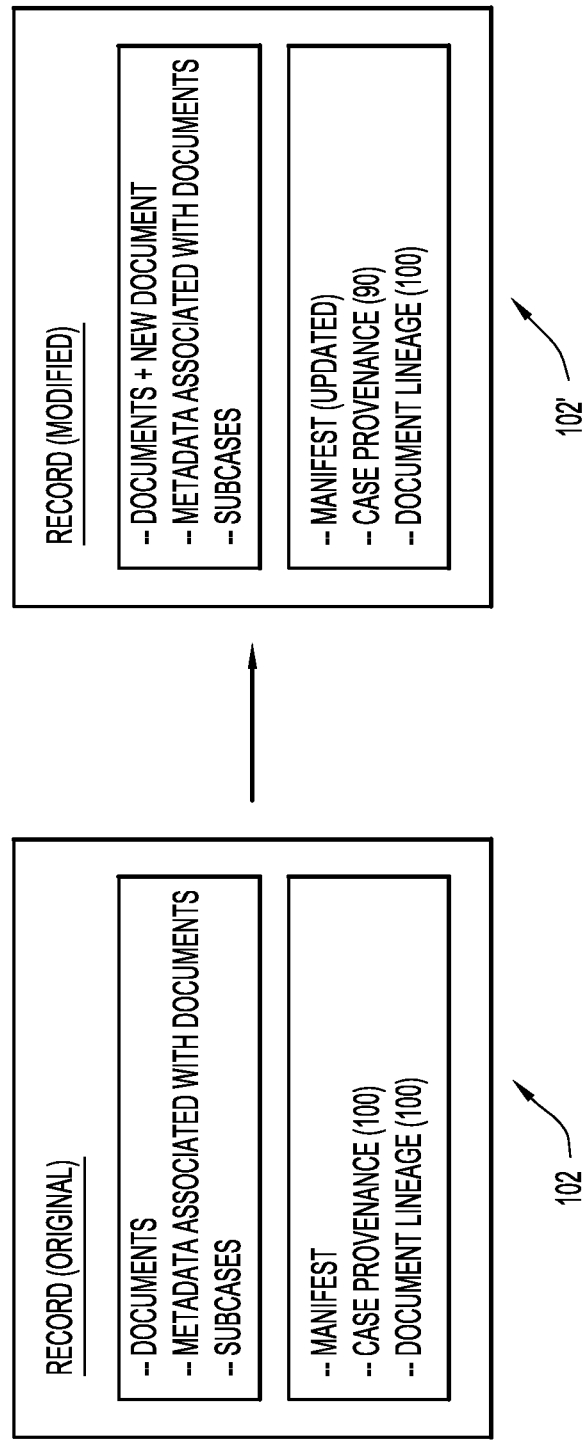

An example showing a change in a record 102 is shown in FIG. 4. The original version of the record 102 includes a manifest and a provenance value of 100 (which indicates no change from the original version of the record). The lineage value of the manifest also has a value of 100 assigned to it. When a user decides to add another document to the record, an updated or modified record 102' results, with a reference to the new document added as part of the record. A reference to the metadata associated with the new document is also added as part of the record, and a modified provenance value is determined based upon the change. In this example, the provenance value has been modified to 90 (e.g., indicating a 10% deviation or change from the original version of the record). The change can also be recorded for the record. For example, the manifest maintains a reference to the original record content (original documents and original metadata associated with such documents stored within a suitable location of the database 20) and also a reference to the storage location associated with record changes. The changes recorded for this scenario may note the addition of the new document, with metadata indicating the author/user adding the document, the date the document was added and/or any other relevant information associated with the change that may be desired or useful for recording with the record. In this example, the lineage value has not changed, since there was no change in authorship to content originally added to the record (i.e., while a new document was added to the record, the metadata associated with the new document includes information about the author which is designated as the original author).

In another example in which a document has been revised, the recorded changes can include the changes made in the document (e.g., any suitable mechanism to show how a document has been changed from its original version, with reference to such changes being accessible via the manifest, such as a "track changes" version of a DOC document where the "track changes" show edits in the document) as well as corresponding metadata associated with such changes (e.g., author/user making the changes to the document, date changes were made, etc.). In a still further example, a user can make changes to metadata associated with one or more documents (e.g., a change in the metadata title or filename, a change in author name, etc. associated with a document). These changes are also recorded. The changes in elements such as changes to a document and/or changes in metadata associated with a document, may be weighted differently in relation to changes due to addition or removal of a document from the record, such that the provenance value does not change to as great a degree for changes to elements within the record without the addition or removal of a document.

In addition, different versions of changes to one or more documents of a record, including metadata associated with such changes, can be stored in a suitable location of the database 20 which is accessible via reference information stored by the manifest of the record. The different versions of content, as well as various possible changes in authorship (e.g., multiple changes to a document within a record made by two or more different users), can be utilized by one or more suitable algorithms to calculate a provenance and/or lineage value that reflects such changes. For example, a document that is modified a second time may result in a further deviation of the provenance value of a record from its original value (e.g., an original provenance value of 100 may be reduced to 97 after a first modification to content of a single document of the record, and a reduction to 95 after a second modification to the content of the same document). In addition, the lineage value may also be further modified if such changes were made by multiple authors (e.g., an original lineage value of 100 may be reduced to 95 after modification of a document of the record by a user/author other than the original author, with a further reduction of the lineage value to 90 with further modification to the same record by a second user/author other than the original author).

The method implemented by the server 10 facilitates allowing users to continue to make content changes to records (e.g., by adding or removing one or more documents from a record and/or changing elements for documents within the record), where such changes result in a change in the provenance value and/or lineage value associated with each record being changed. As a further feature, the case management server 10 can further monitor the provenance and lineage values for each record and, if at least one of the provenance value and the lineage value deviates beyond a desired amount from the original value (e.g., a deviation of provenance value or lineage value from 100 to a value of 50 or lower), the server 10 can provide an alert or other notification (e.g., to a database system administrator or manager) indicating changes to a particular record have exceeded an acceptable level based upon the provenance/lineage value dropping below or falling outside of a threshold level. In particular, the server 10 can provide a notification when a difference between a current indicator value and the indicator value indicating absence of changes to the collection of documents exceeds a threshold value. In addition, the server 10 can further be configured to prevent further modification to any record in which a provenance value or a lineage value has dropped below a threshold level.

The server 10 can further provide an indication to selected users of the provenance value and/or lineage value at any given time (e.g., by user request). In addition, specific changes to the documents and/or other elements of a record can be made accessible by the server 10 to selected users. This provides a user with information regarding how significantly a particular record had been modified since it was created as well as the types of modifications made to the record.

Thus, the embodiments of the present invention facilitate the ability to track and monitor changes made to a record including a collection of documents. This provides a user of the system with the ability to determine a number of pieces of information associated with changes made to the object during a select time period, such as the degree of originality of the record content based upon the provenance value, the lineage value and the types of changes made (e.g., how many documents have been added or removed from the record, what specific changes may have been made to certain documents and/or metadata associated with the documents, how many different authors/users have been involved with addition/removal/element changes for documents of a record, dates in which changes to a record have been made, etc.). In addition, a history of provenance and/or lineage changes for a particular record may be tracked to allow a user to determine how often changes have been made and timeframes associated with such changes. For example, a provenance or lineage history may be provided by the system to a user that indicates types and dates of changes associated with a record, indicating many changes occurred within a selected time period (e.g., a month or two) from the date of origin of the record, whereas the number of changes have been minimized after such selected time period. The tracking and monitoring of changes to records in this manner facilitates a greater understanding of how a record may change and the users responsible for such changes during database operations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Perl, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
generating content information for a collection of documents and assigning an indicator a value indicating absence of changes to the collection of documents;
utilizing the generated content information, detecting a change to the collection of documents that results in a modified collection of documents and adjusting the value of the indicator in accordance with an amount of change to a plurality of documents within the modified collection of documents;
assigning a lineage indicator value indicating a detected change in authorship to one or more documents associated with the modified collection of documents; and
providing a notification when a difference between a current indicator value and the indicator value indicating absence of changes to the collection of documents exceeds a threshold value.

2. The method of claim 1, wherein the change to the collection of documents includes addition of a document.

3. The method of claim 1, wherein the change to the collection of documents includes removal of a document.

4. The method of claim 1, wherein the collection of documents includes one or more elements, and the change to the collection of documents includes a change to the elements.

5. The method of claim 4, wherein the change to the elements comprises a change made to at least one document within the collection.

6. The method of claim 4, wherein the change to the elements comprises a change to metadata associated with at least one document within the collection.

7. The method of claim 1, wherein detecting the change to the collection of documents and adjusting the value of the indicator in accordance with the detected change comprises:
detecting a plurality of types of changes associated with one or more documents in the collection of documents;
weighting the types of changes; and
adjusting the value of the indicator based upon the weighting of the types of changes.

8. A system comprising:
a database to store documents and records comprising collections of documents; and
a server to access the database, the server comprising a processor configured with logic to:
generate content information for a collection of documents and assign an indicator a value indicating absence of changes to the collection of documents;
utilize the generated content information, detect a change to the collection of documents that results in a modified collection of documents and adjusting the value of the indicator in accordance with an amount of change to a plurality of documents within the modified collection of documents;
assign a lineage indicator value indicating a detected change in authorship to one or more documents associated with the modified collection of documents; and
provide a notification when a difference between a current indicator value and the indicator value indicating absence of changes to the collection of documents exceeds a threshold value.

9. The system of claim 8, wherein the change to the collection of documents includes addition of a document.

10. The system of claim 8, wherein the change to the collection of documents includes removal of a document.

11. The system of claim 8, wherein the collection of documents includes one or more elements, and the change to the collection of documents includes a change to the elements.

12. The system of claim 11, wherein the change to the elements comprises a change made to at least one document within the collection.

13. The system of claim 11, wherein the change to the elements comprises a change to metadata associated with at least one document within the collection.

14. The system of claim 8, wherein the processor is further configured with logic to detect the change to the collection of documents and adjust the value of the indicator in accordance with the detected change by:
detecting a plurality of types of changes associated with one or more documents in the collection of documents;
weighting the types of changes; and
adjusting the value of the indicator based upon the weighting of the types of changes.

15. A computer program product comprising:
a non-transitory computer readable storage medium having computer readable program code embodied therewith, the computer readable program code configured to:
generate content information for a collection of documents and assign an indicator a value indicating absence of changes to the collection of documents;
utilize the generated content information, detect a change to the collection of documents that results in a modified collection of documents and adjusting the value of the indicator in accordance with an amount of change to a plurality of documents within the modified collection of documents;
assign a lineage indicator value indicating a detected change in authorship to one or more documents associated with the modified collection of documents; and
provide a notification when a difference between a current indicator value and the indicator value indicating absence of changes to the collection of documents exceeds a threshold value.

16. The computer program product of claim 15, wherein the change to the collection of documents includes addition of a document.

17. The computer program product of claim 15, wherein the change to the collection of documents includes removal of a document.

18. The computer program product of claim 15, wherein the collection of documents includes one or more elements, and the change to the collection of documents includes a change to the elements.

19. The computer program product of claim 18, wherein the change to the elements comprises a change made to at least one document within the collection.

20. The computer program product of claim 18, wherein the change to the elements comprises a change to metadata associated with at least one document within the collection.

21. The computer program product of claim 15, wherein the computer readable program code is configured to detect the change to the collection of documents and adjust the value of the indicator in accordance with the detected change by:

detecting a plurality of types of changes associated with one or more documents in the collection of documents;
weighting the types of changes; and
adjusting the value of the indicator based upon the weighting of the types of changes.

* * * * *